(12) United States Patent
Hoelscher

(10) Patent No.: US 10,584,859 B2
(45) Date of Patent: Mar. 10, 2020

(54) LIGHTING SYSTEM FOR A PALM TREE

(71) Applicant: Sean C. Hoelscher, Myrtle Beach, SC (US)

(72) Inventor: Sean C. Hoelscher, Myrtle Beach, SC (US)

( * ) Notice: Subject to any disclaimer, the term of this patent is extended or adjusted under 35 U.S.C. 154(b) by 0 days.

(21) Appl. No.: 16/256,260

(22) Filed: Jan. 24, 2019

(65) Prior Publication Data

US 2019/0293272 A1    Sep. 26, 2019

Related U.S. Application Data

(60) Provisional application No. 62/647,264, filed on Mar. 23, 2018.

(51) Int. Cl.
| | |
|---|---|
| *F21S 4/00* | (2016.01) |
| *F21V 8/00* | (2006.01) |
| *F21V 21/08* | (2006.01) |
| *F21V 21/32* | (2006.01) |
| *F21S 4/20* | (2016.01) |
| *A47G 33/08* | (2006.01) |
| *A47G 33/10* | (2006.01) |
| *F21S 4/15* | (2016.01) |
| *F21W 131/10* | (2006.01) |

(52) U.S. Cl.
CPC .............. *F21V 21/32* (2013.01); *A47G 33/08* (2013.01); *A47G 33/10* (2013.01); *F21S 4/15* (2016.01); *F21S 4/20* (2016.01); *F21V 21/0816* (2013.01); *G02B 6/0008* (2013.01); *F21W 2131/10* (2013.01)

(58) Field of Classification Search
CPC ........ F21V 21/32; F21V 21/0816; F21S 4/15; F21S 4/20; G02B 6/0008; F21W 2121/04; F21W 2131/10; A01G 7/045; A47G 33/04; A47G 33/08; A47G 33/10
USPC ......................................... 362/566, 567, 568
See application file for complete search history.

(56) References Cited

U.S. PATENT DOCUMENTS

| | | | | |
|---|---|---|---|---|
| 3,752,407 A | * | 8/1973 | Baugh ...................... | F21S 4/10 362/123 |
| 4,462,065 A | * | 7/1984 | Rhodes .................... | F21V 21/02 362/123 |
| 5,984,489 A | * | 11/1999 | Rubenstein ............... | F21S 2/00 362/123 |
| 6,203,171 B1 | | 3/2001 | Sherman, Jr. | |
| 6,592,094 B1 | * | 7/2003 | Kao ........................ | A47G 33/06 248/519 |

(Continued)

*Primary Examiner* — Alan B Cariaso
(74) *Attorney, Agent, or Firm* — Boudwin Intellectual Property

(57) ABSTRACT

A lighting system for a palm tree. The lighting system includes a plurality of adjustable straps having a network of interconnected lights therebetween, and one or more tubular sleeves configured to removably secure a tube having a collection of retractable fiber optic lights therein. The one or more tubular sleeves and the tube are positioned near an upper portion of the network of interconnected lights, thereby enabling placement of the retractable fiber optic lights near an upper portion of the palm tree when the retractable fiber optic lights are in an extended position. After installation of the lighting system onto the palm tree, the network of interconnected lights and the retractable fiber optic lights are illuminated, thereby providing an aesthetically appealing decoration.

10 Claims, 4 Drawing Sheets

(56) References Cited

U.S. PATENT DOCUMENTS

| | | | |
|---|---|---|---|
| 7,014,331 B2 | 3/2006 | Risch et al. | |
| 8,485,690 B1 * | 7/2013 | Garcia | F21S 4/15 |
| | | | 362/145 |
| 8,801,227 B1 * | 8/2014 | Loomis | F21V 21/088 |
| | | | 362/249.19 |
| 2007/0041189 A1 | 2/2007 | McHinnis et al. | |
| 2007/0097701 A1 * | 5/2007 | Vaught | F21V 21/08 |
| | | | 362/564 |
| 2009/0041413 A1 * | 2/2009 | Hurley | G02B 6/4457 |
| | | | 385/101 |
| 2012/0040110 A1 * | 2/2012 | Harman, II | A47G 33/10 |
| | | | 428/19 |
| 2015/0077999 A1 * | 3/2015 | Chen | F21V 23/001 |
| | | | 362/249.08 |
| 2016/0265751 A1 | 9/2016 | Raya et al. | |
| 2016/0331172 A1 * | 11/2016 | Bauer | A47G 33/10 |
| 2017/0248284 A1 * | 8/2017 | Baldwin | F21S 4/15 |
| 2018/0100958 A1 * | 4/2018 | McRae | A47G 33/08 |

* cited by examiner

LIGHTING SYSTEM FOR A PALM TREE

CROSS REFERENCE TO RELATED APPLICATIONS

This application claims priority under 35 U.S.C. § 119(e) to U.S. Provisional Application No. 62/647,264 filed on Mar. 23, 2018. The above identified patent application is incorporated by reference herein in its entirety to provide continuity of disclosure.

BACKGROUND OF THE INVENTION

The present invention relates to a decorative lighting system for a palm tree.

Decorative lighting systems are often not suited for appealingly decorating a palm tree. Single-strand lights may be wrapped around a trunk of the palm tree, but there are often substantial gaps in the lights along the trunk of the palm tree, and in addition, an upper portion of the palm tree, having a collection of palm tree leaves, is not able to be decorated by these systems. This is unfortunate, because palm tree leaves are a central aesthetic characteristic of palm trees. As a result, existing decorative lighting systems are unable to produce an appealing decoration for the palm tree.

Therefore, there is a need in the art for a decorative lighting system for a palm tree. The present invention addresses this unmet need.

Systems have been disclosed in the art that relate to decorative lighting systems. These include systems that have been patented and published in patent application publications. These systems are often inadequate and unsatisfactory. In view of the systems disclosed in the art, it is submitted that there is a need in the art for an improvement to existing decorative lighting systems. In view of the present disclosure, it is submitted that the present invention substantially diverges in structural and functional elements from systems in the art, and substantially fulfills an unmet need in the art.

SUMMARY OF THE INVENTION

In view of the disadvantages inherent in the known types of decorative lighting systems in the art, the present invention provides a new and improved lighting system for a palm tree, wherein the same can be utilized for decorating the palm tree.

It is therefore an object of the present invention to provide a lighting system for decorating a palm tree.

In one aspect, the invention provides a lighting system for a palm tree, having a plurality of adjustable straps, configured to attach to a trunk of the palm tree. The lighting system includes a network of interconnected lights attached to the plurality of adjustable straps, such that the network of interconnected lights occupy a space between a selection of adjustable straps of the plurality of adjustable straps. In addition, the lighting system includes one or more tubular sleeves, positioned near an upper portion of the network of interconnected lights, such that the one or more tubular sleeves are configured to removably secure a tube containing a collection of retractable fiber optic lights. Generally, the network of interconnected lights and the retractable fiber optic lights are configured to be illuminated to decorate the palm tree.

Another object of the present invention is to provide a lighting system for a palm tree that may be readily manufactured from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of the invention will be particularly pointed out in the claims, the invention itself and manners in which it may be made and used may be better understood after a review of the following description, taken in connection with the accompanying drawings, wherein like numeral annotations are provided throughout.

DETAILED DESCRIPTION OF THE INVENTION

Figure 1:
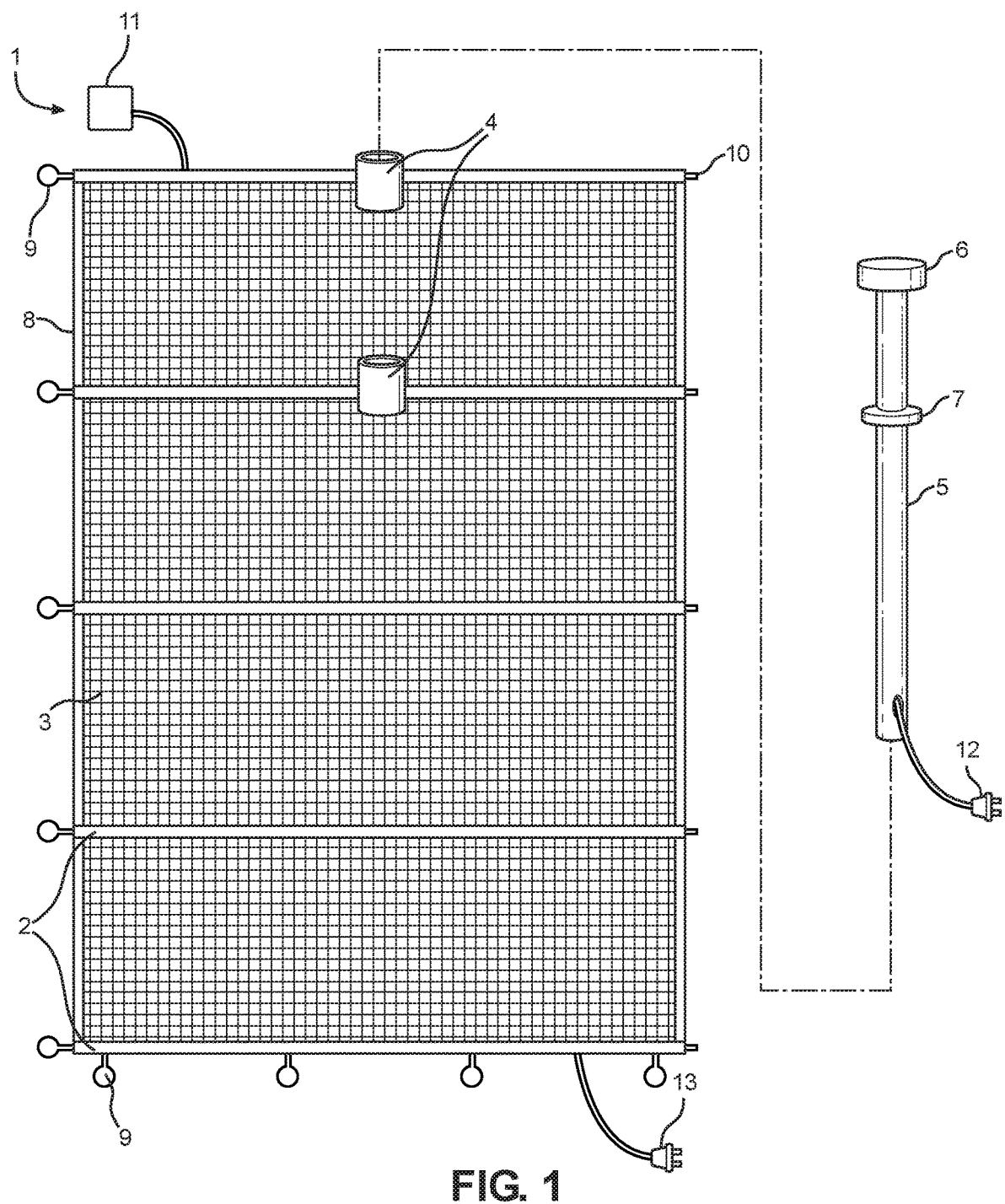
FIG. 1 depicts a front view of an exemplary lighting system for a palm tree.

Reference is made herein to the attached drawings. Like reference numerals are used throughout the drawings to depict like or similar elements of the lighting system for the palm tree. The figures are intended for representative purposes only and should not be considered limiting in any respect.

Reference is now made to the drawings, which depict one or more exemplary embodiments of the invention.

Referring now to FIG. 1, there is depicted a front view of an exemplary lighting system for a palm tree. The lighting system 1 includes a plurality of adjustable straps 2, configured to attach to a trunk of the palm tree, and a network of interconnected lights 3 attached to the plurality of adjustable straps 2, such that the network of interconnected lights 3 occupy a space between a selection of adjustable straps of the plurality of adjustable straps 2. The network of interconnected lights 3 includes a grid of perpendicularly intersecting light strings configured to illuminate the trunk of the palm tree. The lighting system 1 also includes one or more tubular sleeves 4, positioned near an upper portion of the network of interconnected lights 3, such that the one or more tubular sleeves 4 are configured to removably secure a tube 5 containing a collection of retractable fiber optic lights. In the shown embodiment, the lighting system 1 includes two tubular sleeves 4, configured as two separate cylindrical members vertically aligned. In this manner, when the tube 5 is placed inside the two tubular sleeves 4, the tube 5 is perpendicular to the plurality of adjustable straps 2. Generally, the network of interconnected lights 3 and the retractable fiber optic lights are configured to be illuminated to decorate the palm tree.

In the shown embodiment, the collection of retractable fiber optic lights are inside the tube 5, in a retracted configuration (i.e., such that they are contained entirely within the tube 5), and are covered by a locking cap 6 positioned atop the tube 5. To expose the retractable fiber optic lights, the locking cap 6 may be removed from the top of the tube 5, such as by sliding the locking cap 6 down the tube 5 to a position at or above a tube ridge 7; in such an embodiment, the locking cap 6 includes a permeable top that allows the retractable fiber optic lights to pass therethrough upon application of sufficient force to penetrate the permeable top. The locking cap 6 may be designed and manufactured according to any suitable means, including placement of an aperture or a slit through the top of the tube 5 that is biased in a closed position; in this manner, forcing the locking cap 6 downward enables the locking cap 6 to slide over the tube 5, exposing the collection of retractable fiber optic lights therein for placement of the collection of retractable fiber optic lights in the extended configuration. In the shown embodiment, the tube ridge 7 is a cylindrical member extending perpendicularly and radially outward from an exterior of the tube 5, at a vertically intermediate position. In this manner, the tube ridge 7 is configured to provide a rest point for the locking cap 6, preventing the locking cap 6 from sliding further down the tube 5. In other embodiments, the locking cap 6 may be removed from the top of the tube 5 by other means, such as by unscrewing or unclipping the locking cap 6, according to a particular necessity or design preference.

In the shown embodiment, the plurality of adjustable straps 2 are horizontal, and are attached on both ends to a vertical strap 8. The vertical straps 8, along with an uppermost and a lowermost adjustable strap of the plurality of adjustable straps 2, define a rectangular perimeter of the network of interconnected lights 3, and represent a maximum surface area coverable by the network of interconnected lights 3. In some embodiments, a selection of the plurality of adjustable straps 2 includes a plurality of fasteners 9 which may be used to vertically link two or more lighting systems 1 to form a combinatorial lighting system configured to fit around the trunk of the palm tree along a majority of a height of the palm tree. In some embodiments, a selection of the vertical straps 8 includes a plurality of fasteners (9, 10) which may be used to horizontally link two or more lighting systems 1 to form a combinatorial lighting system configured to fit around the trunk of the palm tree, regardless of a circumference of the trunk of the palm tree. In this manner, the lighting system 1 is configured to be modular and able to adapt to any shape or size of palm tree so desired.

In a particular embodiment, each light of the network of interconnected lights 3 is attached to a fastener, forming all or part of a plurality of fasteners (9, 10). The fastener so attached to the light of the network of interconnected lights 3 is configured to enable two or more lighting systems 1 to be vertically adjoined, horizontally adjoined, or irregularly adjoined, according to necessity. The fastener so attached to the light of the network of interconnected lights 3 may be any fastener suitable for this purpose, such as a swivel snap fastener or equivalent. In this manner, the network of interconnected lights 3 of a first lighting system 1 may intermingle with and secure to the network of interconnected lights 3 of a second lighting system 1.

The network of interconnected lights 3 includes a female electrical adaptor 11, configured to electrically connect to a male electrical adaptor 12 of the collection of retractable fiber optic lights. In this manner, the network of interconnected lights 3 and the collection of retractable fiber optic lights are configured to be illuminated upon delivery of an electrical current therethrough. In addition, the network of interconnected lights 3 and the collection of retractable fiber optic lights are part of a single electric circuit. In this manner, delivery of the electrical current through the network of interconnected lights 3 and the collection of retractable fiber optic lights is simplified and facilitated.

Figure 2:
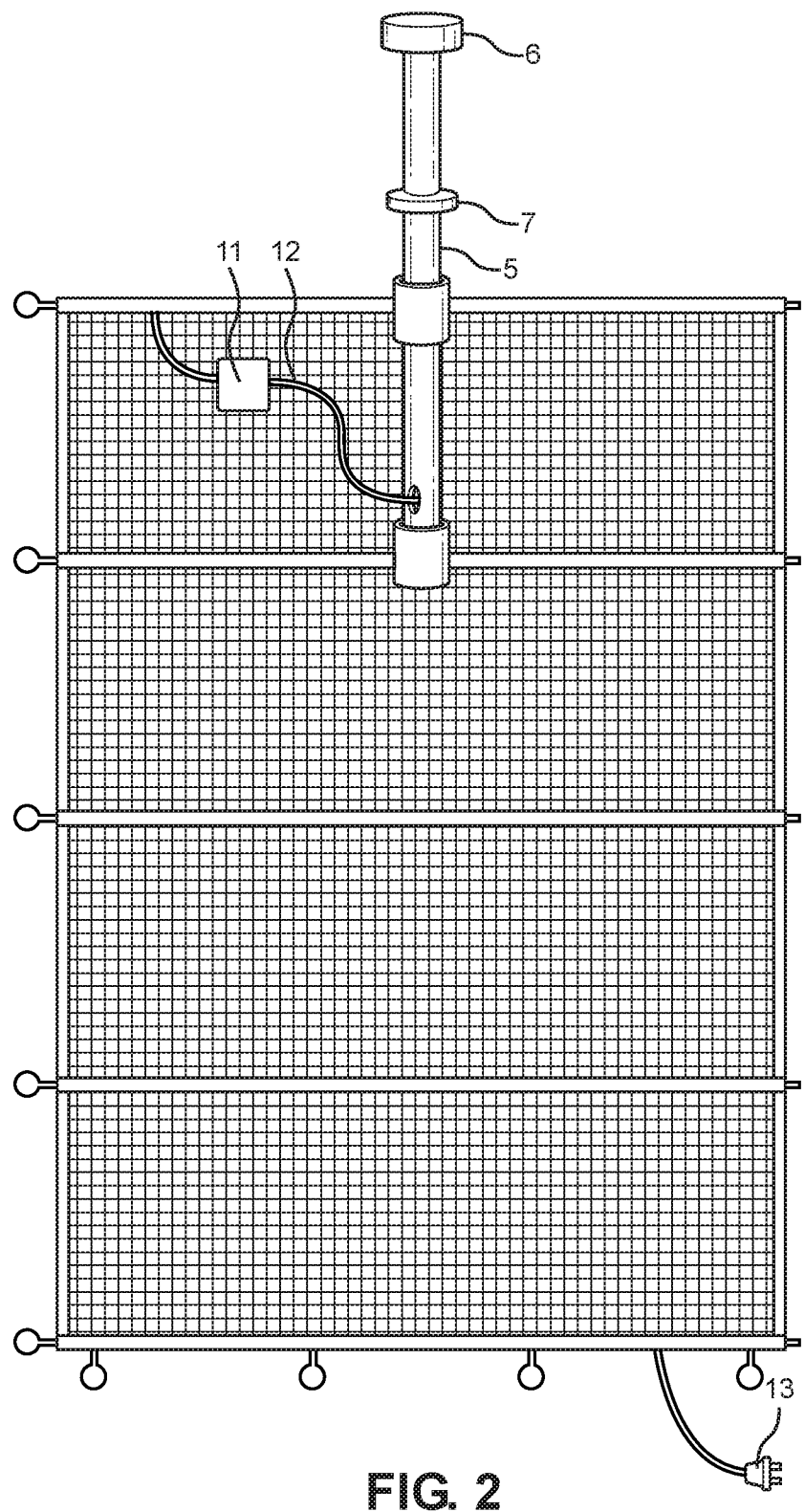
FIG. 2 depicts a front view of the exemplary lighting system for the palm tree, wherein a tube containing a collection of retractable fiber optic lights has been inserted into two tubular sleeves, and wherein a network of interconnected lights and the collection of retractable fiber optic lights has been electrically connected to each other.

Referring now to FIG. 2, there is depicted a front view of the exemplary lighting system for the palm tree, wherein a tube containing a collection of retractable fiber optic lights has been inserted into two tubular sleeves, and wherein a network of interconnected lights and the collection of retractable fiber optic lights have been electrically connected to each other. In the shown embodiment, the tube 5 has been inserted into two tubular sleeves, and the collection of retractable fiber optic lights has been electrically connected to the network of interconnected lights (connection 11, 12), configuring the lighting system for delivery of the electrical current through the single electric circuit. The tube 5 is depicted in the closed configuration, such that the collection of retractable fiber optic lights is contained therein by the tube 5 and the locking cap 6. From this configuration, the locking cap 6 may be slid down the tube 5, to a position no lower than the tube ridge 7, to expose the collection of retractable fiber optic lights. A circuit male electrical adapter 13 is shown in an unplugged configuration, and the electrical current is not being delivered through the single electric circuit. In this manner, the lighting system is configured to be attached or installed onto the palm tree.

Figure 3:
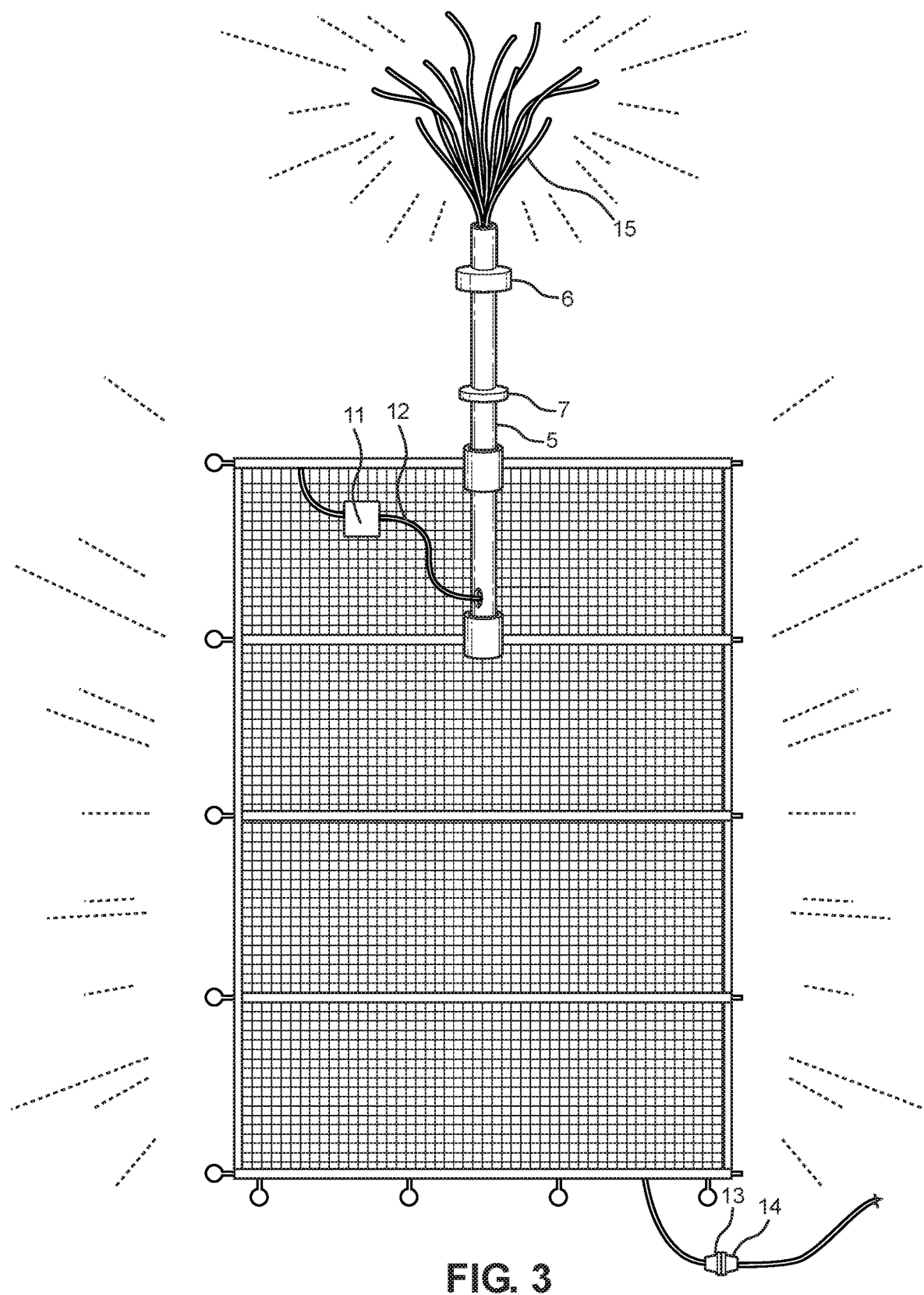
FIG. 3 depicts a front view of the exemplary lighting system for the palm tree, wherein the collection of retractable fiber optic lights has been placed in an extended configuration, and wherein the network of interconnected lights and the collection of retractable fiber optic lights have been electrically connected to a source of electric power for illumination.

Referring now to FIG. 3, there is depicted a front view of the exemplary lighting system for the palm tree, wherein the collection of retractable fiber optic lights has been placed in an extended configuration, and wherein the network of interconnected lights and the collection of retractable fiber optic lights have been electrically connected to a source of electric power for illumination. As described elsewhere herein, the tube 5, having the locking cap 6 thereon, is positioned near an upper portion of the network of interconnected lights. When the collection of retractable fiber optic lights 15 has been electrically connected to the network of interconnected lights (connection 11, 12), and when the circuit male electrical adapter 13 is plugged into an outlet or an extension cord 14 carrying electrical current, the electrical current is delivered through the single electric circuit to illuminate the network of interconnected lights and the collection of fiber optic lights 15, shown here in the extended configuration (i.e., such that they protrude outward and upward from a top of the tube 5), with the locking cap 6 placed in an intermediate position between the tube ridge 7 and the top of the tube 5.

Figure 4:
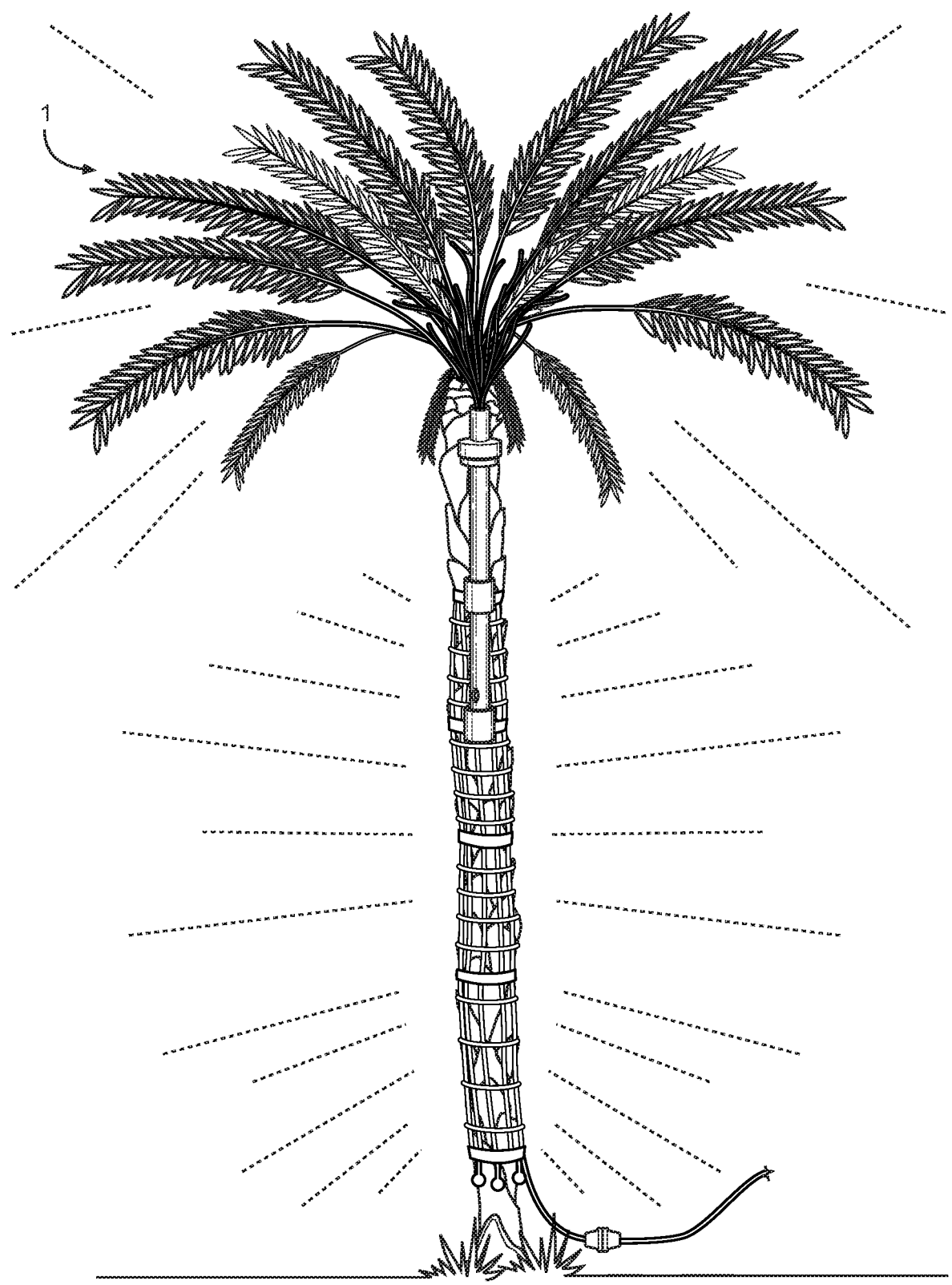
FIG. 4 depicts a front view of the exemplary lighting system for the palm tree, wherein the lighting system has been installed onto the palm tree and illuminated to decorate the palm tree.

Referring now to FIG. 4, there is depicted a front view of the exemplary lighting system for the palm tree, wherein the lighting system has been installed onto the palm tree and illuminated to decorate the palm tree. The extension cord is shown broken away to emphasize the shown embodiment. After installation of the lighting system 1 onto the palm tree, and after delivery of electrical current to the lighting system 1, the network of interconnected lights and the collection of retractable fiber optic lights are illuminated to light the palm tree, thereby providing an aesthetically appealing decoration.

The lighting system 1 may be installed onto the palm tree by inserting the tube into the tubular sleeves, connecting the collection of retractable fiber optic lights to the network of interconnected lights, securing the lighting system 1 to the palm tree (adjusting fit of the lighting system 1 as needed), connecting the circuit male electrical adapter to an electrical power source, and placing the collection of fiber optic lights into the extended configuration. After installation, the electrical power source is used to illuminate the network of interconnected lights and the collection of retractable fiber optic lights to decorate the palm tree.

The foregoing descriptions of specific embodiments of the present invention have been presented for purposes of illustration and description. They are not intended to be exhaustive or to limit the present invention to the precise forms disclosed, and modifications and variations are possible in view of the above teaching. The exemplary embodiment was chosen and described to best explain the principles of the present invention and its practical application, to thereby enable others skilled in the art to best utilize the present invention and its embodiments with modifications as suited to the use contemplated.

It is therefore submitted that the present invention has been shown and described in the most practical and exemplary embodiments. It should be recognized that departures may be made which fall within the scope of the invention. With respect to the description provided herein, it is submitted that the optimal features of the invention include variations in size, materials, shape, form, function and manner of operation, assembly, and use. All structures, functions, and relationships equivalent or essentially equivalent to those disclosed are intended to be encompassed by the present invention.

I claim:

1. A lighting system for a palm tree, comprising:
  a plurality of adjustable straps, configured to attach to a trunk of the palm tree;
  a network of interconnected lights attached to the plurality of adjustable straps, wherein the network of interconnected lights occupy a space between a selection of adjustable straps of the plurality of adjustable straps;
  one or more tubular sleeves, positioned near an upper portion of the network of interconnected lights, wherein the one or more tubular sleeves are configured to removably secure a tube containing a collection of retractable fiber optic lights;
  wherein the network of interconnected lights and the retractable fiber optic lights are configured to be illuminated to decorate the palm tree.

2. The lighting system of claim 1, wherein the retractable fiber optic lights are near an upper portion of the palm tree after the tube is placed into the one or more tubular sleeves, the lighting system is attached to the palm tree, and the retractable fiber optic lights are placed in an extended configuration.

3. The lighting system of claim 1, wherein the tube includes a locking cap, configured to close an upper opening of the tube to secure the collection of retractable fiber optic lights within the tube.

4. The lighting system of claim 1, comprising a plurality of fasteners attached to the lighting system and configured to enable adjustment of a size of the lighting system to fit the lighting system to the palm tree.

5. The lighting system of claim 4, wherein the plurality of fasteners are attached to the selection of adjustable straps of the plurality of adjustable straps.

6. The lighting system of claim 5, wherein the plurality of fasteners are configured to enable vertical linkage of two or more lighting systems to form a combinatorial lighting system, wherein the combinatorial lighting system is configured to fit around the trunk of the palm tree along a majority of a height of the palm tree.

7. The lighting system of claim 4, wherein the plurality of fasteners are attached to the network of interconnected lights.

8. The lighting system of claim 7, wherein each light of the network of interconnected lights is attached to a fastener of the plurality of fasteners.

9. The lighting system of claim 1, wherein the network of interconnected lights and the collection of retractable fiber optic lights are configured to be illuminated upon delivery of an electrical current therethrough.

10. The lighting system of claim 9, wherein the network of interconnected lights and the collection of retractable fiber optic lights are part of a single electric circuit.

* * * * *